United States Patent [19]
Junginger

[11] Patent Number: 6,068,327
[45] Date of Patent: May 30, 2000

[54] UPWARDLY FOLDING VEHICLE DOOR ASSEMBLY

[75] Inventor: Michael Junginger, Renningen, Germany

[73] Assignee: Peregrine Incorporated, Southfield, Minn.

[21] Appl. No.: 08/955,207

[22] Filed: Oct. 21, 1997

[51] Int. Cl.[7] ...................................................... B60J 1/18
[52] U.S. Cl. ........................ 296/146.13; 160/213; 296/56; 296/106; 296/146.8
[58] Field of Search ............................ 296/146.13, 146.1, 296/146.11, 50, 56, 106, 76, 146.8; 49/398, 383; 160/229.1, 206, 213, 207

[56] References Cited

U.S. PATENT DOCUMENTS

| | | | |
|---|---|---|---|
| 2,393,052 | 1/1946 | Medhard | 160/185 |
| 2,597,174 | 5/1952 | Patton et al. | 20/16 |
| 3,319,697 | 5/1967 | Krohn | 160/229 |
| 3,713,472 | 1/1973 | Dozois | 160/189 |
| 3,716,945 | 2/1973 | Cooper et al. | 49/139 |
| 3,941,180 | 3/1976 | Thill | 160/229 |
| 4,184,709 | 1/1980 | Kim . | |
| 4,315,345 | 2/1982 | Schijf | 16/267 |
| 4,367,780 | 1/1983 | Walcher | 160/213 |
| 4,609,027 | 9/1986 | Keller | 160/207 |
| 4,620,743 | 11/1986 | Eke . | |
| 4,688,844 | 8/1987 | Hirose et al. | 296/76 |
| 5,040,334 | 8/1991 | Dossin et al. | 49/502 |

FOREIGN PATENT DOCUMENTS

| | | |
|---|---|---|
| 2695877 | 3/1994 | France . |
| 1480429 | 6/1969 | Germany . |
| 3102891 | 8/1982 | Germany . |

Primary Examiner—Dennis H. Pedder
Assistant Examiner—Mickki D. Murray
Attorney, Agent, or Firm—Rader, Fishman & Grauer PLLC

[57] ABSTRACT

An upwardly folding door for a vehicle is disclosed having a lower door section that pivots inwardly and upwardly toward an upper door section. A pair of struts are attached between the vehicle body and the upper section and a link is attached between each strut and the lower door section. In addition, a shield feature is provided between the upper and lower door sections to cover any gaps that may exist when the door is in an open condition. The door sections have frames that are preferably made from a suitable lightweight material to appreciably reduce the overall weight of the door while still providing desired structural rigidity.

19 Claims, 2 Drawing Sheets

UPWARDLY FOLDING VEHICLE DOOR ASSEMBLY

FIELD OF THE INVENTION

The present invention relates to a door for a vehicle and, in particular, to an upwardly folding vehicle door to selectively close, for example, a rear opening in a vehicle body. The folding door of the present invention has a lower panel that is pivotally connected to an upper panel. The lower panel pivots inwardly and upwardly toward the upper section to effect opening.

BACKGROUND OF THE INVENTION

Upwardly folding doors are known in the prior art for closing rear openings in vehicles. Some of the known doors have roller tracks to guide folding door travel. Other known doors rely on pivoting linkages for guiding the doors during opening and closing operations.

One known upwardly folding rear door design has a lower door panel that folds inwardly and upwardly toward an upper door panel to gain access to the rear of a vehicle. A dividing hinged shaft connects the upper panel to the lower panel and allows relative movement. In addition, a single pivoting link is attached to each side of the door to guide door travel.

Another known upwardly folding rear door design includes blow molded plastic upper and lower panels connected together by an integrally formed plastic living hinge. A single strut is pivotally attached to each side of the door and connects to an upper part of the upper panel.

Yet another known upwardly folding door has upper and lower panels connected for folding along a horizontal axis. The door has a complex linkage arrangement having a single link pivotally attached on each side of the lower panel, with another pair of linkages pivotally interconnected to the single links and actuated by a power cylinder to automatically control door movement.

However, most known upwardly folding doors are relatively heavy because they have inner and outer structural panels stamped from steel that are hemmed and spot welded along peripheral, flanged edges to form a door. The plastic door mentioned above reduces weight, but sacrifices durability by using a living plastic hinge. Using plastic as a structural component reduces the overall stiffness and strength of the door. Thus, the conventional folding doors do not provide light weight without sacrificing bending stiffness and impact strength.

Further, conventional folding doors have unsatisfactory guiding systems. Some known designs are too complex, using roller tracks and/or several interconnected links having multiple pivot points. The complex designs are costly to produce. Other conventional folding doors have inadequate supports, providing only single links on each side of a door. Thus, the link's pivot points can become over stressed, causing wear, which leads to a loosely guided door.

SUMMARY OF THE INVENTION

The present invention is directed to an upwardly folding door for a vehicle having an upper door section for pivotally mounting to the vehicle for rotation about a first horizontal pivot axis and a lower door section pivotally connected to the upper door section for rotation about a second horizontal pivot axis. A first link, in the form of a strut, has one end pivotally attached to the vehicle and another end attached to the upper door section. A second link is attached at one end to the first link and at the opposite end to the lower door section. Preferably, the second link is pivotally attached to the outer strut housing of the first link to provide improved kinematic movement of the door. In particular, the first link attaches to the upper section at a location along a lower third of the upper section's length. The second link attaches at a location along an upper half of the lower section.

The upper and lower sections have upper and lower frames, respectively. Each frame is preferably cast from magnesium to reduce door weight up to 40% compared to conventional designs. However, the present design does not sacrifice bending stiffness and impact strength to achieve such a substantial weight reduction. Cast magnesium provides an increased ductility that improves overall toughness of the door. Moreover, certain features are integrally formed with the frames to reduce the total number of parts and their associated assembly time. For instance, an accessory mount and central hinge components are integrally cast with the frames. Also, part of an upper hinge is integrally cast for attachment with a remaining portion of a corresponding vehicle hinge. Upper and lower frames include U-shaped channel portions having reinforcing webs and/or reinforcing brackets to increase bending stiffness and provide a strong structure for the folding door.

Another feature of the present invention is the use of a window panel as a structural component that further stiffens and reinforces the upper section. The window panel is fixedly attached, for example, by bonding to provide uniform reinforcement.

The present invention further includes a shield feature that includes an arcuately shaped lower surface on the upper section positioned in overlapping relationship with a complementary shaped surface on an upper surface of the lower panel, to cover any gap that would otherwise exist between the hinged sections during opening and closing movements. Thus, a clean, curved door appearance is achieved that reduces or eliminates the chances that objects will become caught between the folding sections.

Therefore, the upwardly folding door of the present invention has high strength and structural integrity with reduced weight. Assembly time is reduced compared to conventional doors and an improved door appearance is achieved that has a shield feature and an improved linkage arrangement for improved kinematic motion.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
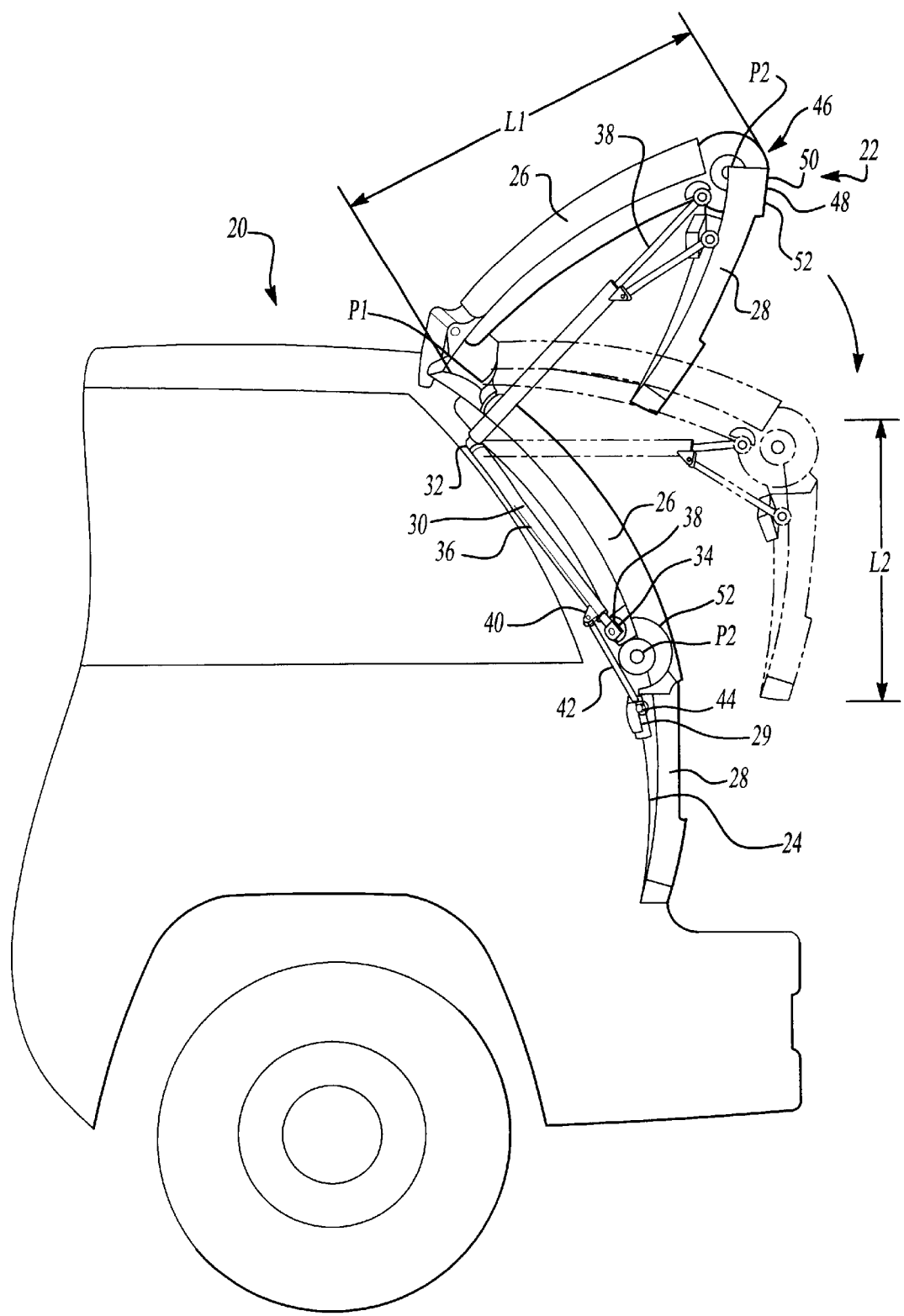
FIG. 1 is side view of a door according to the present invention.

FIG. 1 shows a vehicle 20 having an upwardly folding door 22 that selectively closes an opening 24 for accessing vehicle 20. Door 22 is shown in various operational positions, including a closed position, a partially open position (shown in dashed outline), and a fully open position. Door 22 includes an upper panel 26 pivotally mounted to vehicle 20 about a horizontal pivot axis P1. Upper panel 26 is rotatingly connected to a lower panel 28 about a second horizontal pivot axis P2 such that lower panel 28 folds inwardly and upwardly relative to upper panel 26. Upper and lower panels 26, 28 have lengths L1 and L2, respectively, and are held in a closed position by a pair of latches 29 located on opposite sides of lower panel 28.

A strut 30 has a first end 32 pivotally attached to vehicle 20 and a second end 34 pivotally attached to upper panel 26, at a location along a lower third of length L1. Preferably, second end 34 is located adjacent second pivot axis P2, to provide relatively easy kinematic movement of door 22. Strut 30 includes a housing 36 and rod 38 that reciprocates linearly in housing 36 to vary the overall strut length. Rod 38 is retracted when door 22 is closed and extended when door 22 is open.

Pivotally attached to an exterior portion of housing 36, is a first end 40 of a link 42. A second link end 44 is pivotally attached to lower panel 28. Link 42 helps to fold lower panel 28 under upper panel 26, during door opening movement, by connecting strut housing 36 to lower panel 28. Link 42 is attached at a location along an upper half of lower panel 28. Preferably, link 42 is attached within an upper third of length L2, to provide adequate folding of door 22.

In addition, door 22 has a shield feature 46 to at least partially cover any gap that would otherwise be created near the second horizontal pivot axis P2, when an upper edge 48 of lower panel 28 rotates away from upper panel 26 during opening. Shield 46 includes a lower surface 50 on upper panel 26 that cooperates with an upper surface 52 on lower panel 28. Lower surface 50 has a generally arcuate cross-sectional shape and is positioned concentrically with complementary shaped upper surface 52 on lower panel 28. Lower surface 50 has a greater arc length than upper surface 52 such that upper surface 52 constantly overlaps with lower surface 50. Overlapping prevents objects, such as hands, arms or even broom handles, from being inserted between upper and lower panels 26, 28 and becoming pinched. Although lower surface 50 is shown as concave and complementary shaped surface 52 as convex, these surface shapes could be reversed. It is also envisioned to use any suitable cooperating shapes that achieve at least a partial shielding effect of a gap that exists between the upper and lower panels 26, 28 during partially or fully opened positions. Finally, an interior trim panel (not shown), having trim components, is attached to the interior side of door 22.

Figure 2:
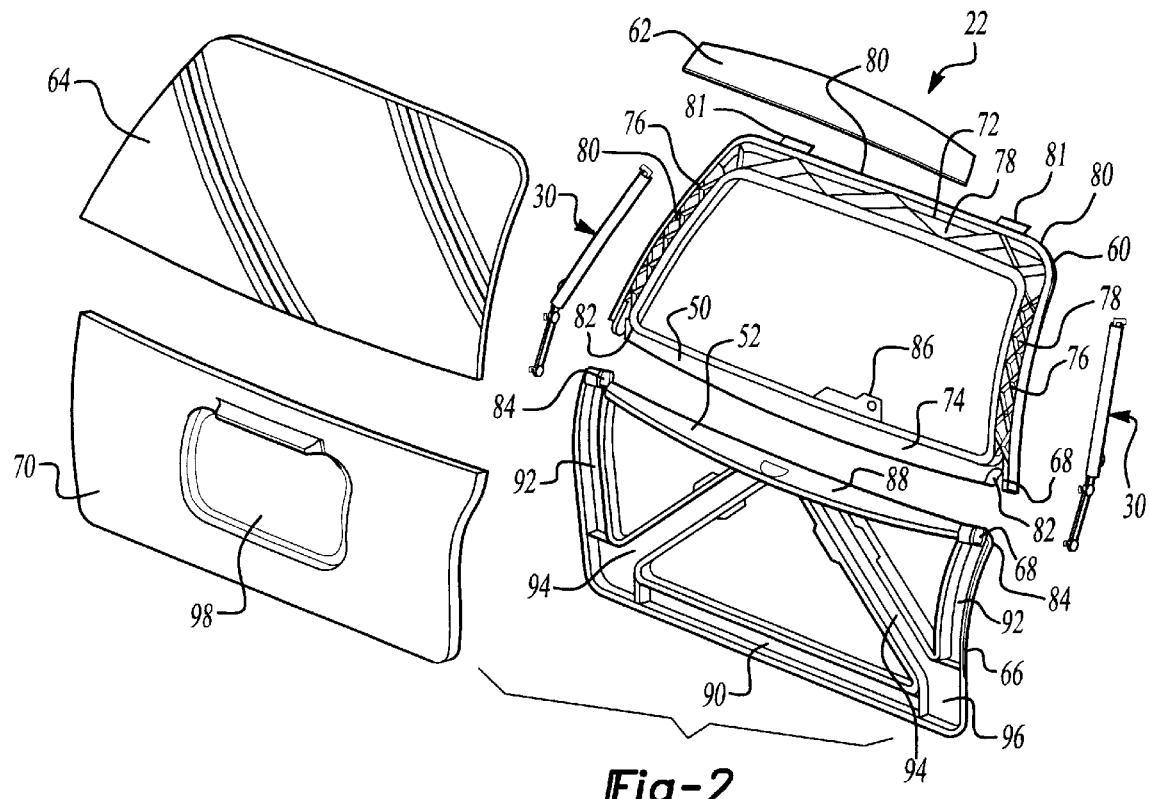
FIG. 2 is an exploded perspective view of a door according to the present invention.

FIG. 2 shows an exploded view of door 22 including an upper frame 60 for receiving a pair of struts 30, an upper exterior panel 62, and a window panel 64. A lower frame 66 pivotally connects to upper frame 60 at hinges 68. In addition, a lower exterior panel 70 attaches to the exterior of lower frame 66.

Upper frame 60 can be made from any suitable material including, for example, aluminum, magnesium, plastic, or steel. Preferably, upper frame 60 is cast from magnesium to substantially reduce the weight of door 22 without sacrificing structural integrity and strength. Upper frame 60 has a generally trapezoidal shape with a horizontal upper member 72 connected to a horizontal lower member 74 by a pair of generally vertical side members 76. Upper frame 60 curves convexly from upper member 72 to lower member 74 and also curves convexly between side members 76. Upper member 72 and side members 76 include generally U-shaped channel portions 78 that at least partially contain reinforcing webs 80 to increase bending stiffness. Reinforcing webs 80 are shown as being X-shaped or V-shaped, but any suitable shape is envisioned to provide reinforcement to upper frame 60. In addition, upper member 72 includes approximately one half of an attachment hinge 81 that is cast integrally as part of upper member 72 to form a single piece component. One or more hinges 81 can be provided for attachment. A corresponding number of complementary hinge halves (not shown) would be attached to vehicle 20 for pivotally connecting door 22 to vehicle 20. Lower member 74 contains lower surface 50 that is described above for providing shield feature 46. Distal ends of lower member 40 have hinge cutouts 82 for receiving projecting hinges 84 on lower frame 66 to allow folding between upper and lower frames 60, 66. In addition, struts 30 attach to side members 76 of upper frame 60. Finally, lower member 74 includes an accessory mounting bracket 86 that is cast integrally as one-piece with upper frame 60. Accessory mounting bracket 86 provides mounting for such accessories as, for example, a wiper motor or an auxiliary brake lamp.

Upper exterior panel 62 generally covers the exterior side of upper member 72 and is fabricated from any suitable material, including, for example, aluminum, steel, or plastic. Upper panel 62 is attached to upper frame 60 using any suitable fastening technique, including, for example, welding, mechanically fastening, or adhesively bonding.

Window panel 64 is made of any suitable transparent material including glass or plastic. Preferably, window panel 64 is made of glass and is fixedly bonded to upper frame 60 to provide increased structural rigidity and stiffness. Alternatively, window panel 64 can also be movably connected to door 22 to provide additional access into the interior of vehicle 20.

Lower frame 66 can be made from any suitable material including, for example, aluminum, magnesium, plastic, or steel. Preferably, lower frame 66 is cast from magnesium to substantially reduce the weight of door 22 without sacrificing structural integrity and strength. Lower frame 66 has a generally rectangular shape with horizontal upper member 88 connected to lower member 90 by vertical side members 92. Lower frame 66 curves convexly from upper member 88 toward lower member 90. In addition, lower frame 66 curves convexly between side members 92. A pair of reinforcing brackets 94 are illustrated as being diagonally attached between upper member 88 and lower corners 96 defined by the intersection of side members 92 and lower member 90. Lower member 90, side members 92 and reinforcing brackets 94 each have generally U-shaped cross-sections. Upper member 88 includes complementary shaped surface 52 for cooperating with lower surface 50 to provide shield feature 46, discussed above. Respective ends of upper member 88 include projecting hinges 84 for connecting with hinge cutouts 82.

Lower exterior panel 70 covers most of the exterior side of lower frame 66 and includes a central recessed portion 98 for receiving a license plate (not shown) and/or an actuating handle (not shown). Like upper panel 62, lower panel 70 is fabricated from any suitable material, including, for example, aluminum, steel, or plastic. Lower panel 70 is attached to lower frame 66 using any suitable fastening technique, including, for example, welding, mechanical fastening, or adhesive bonding.

Figure 3:
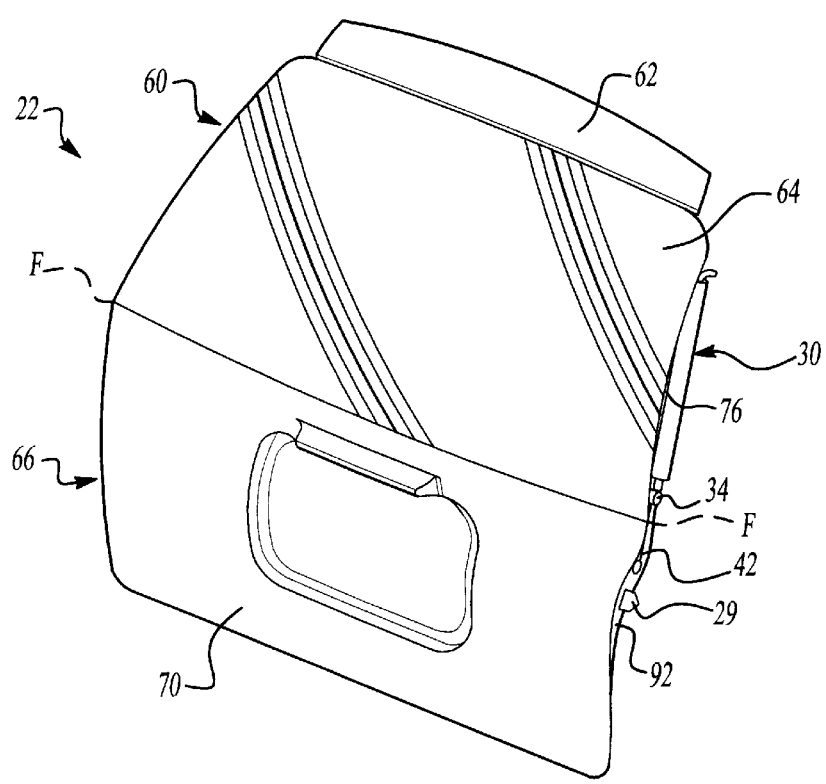
FIG. 3 is perspective view of a door in a closed position, in accordance with the present invention.

FIG. 3 shows a perspective exterior view of door 22 in a substantially closed position. Upper exterior panel 62 abuts window panel 64 and strut 30 is connected to lower side member 76 at second end 34. Link 42 is connected between strut 30 and side member 92. Window panel 64 and lower exterior panel 70 are separated along a fold line F along which window panel 64 and upper frame 60 fold relative to lower panel 70 and lower frame 66. One of a pair of latches 29 is also shown attached to lower side member 76. Locating latches 29 along sides 76 provides generally equal sealing forces around the periphery of door 22, when closed.

In the illustrated embodiments, door 22 is shown as a rear liftgate, however, other door locations, such as on the sides of a vehicle, are also envisioned.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A door for a vehicle to selectively close an opening that permits access into the vehicle, comprising:

an upper door section for pivotally mounting to the vehicle for rotation about a first substantially horizontal pivot axis;

a lower door section pivotally connected to said upper door section for rotation about a second substantially horizontal pivot axis;

a first link having a first end for pivotal connection to the vehicle and a second end pivotally connected to said door, wherein said first link is a strut having an outer housing and a rod that is movable linearly relative to said outer housing; and a second link having a first end pivotally connected to said first link and a second end pivotally connected to said door.

2. The door of claim 1, wherein said second link is pivotally connected to said outer housing of said strut.

3. The door of claim 1, wherein said first link is pivotally connected to said upper door section.

4. The door of claim 1, wherein said second link is pivotally connected to said lower door section.

5. The door of claim 1, wherein said upper door section has a predetermined length and said first link is pivotally connected at a location along a lower third of said predetermined length.

6. The door of claim 1, wherein lower door section has a predetermined length and said second link is pivotally connected at a location along an upper half of said predetermined length.

7. The door of claim 1, wherein at least a portion of a hinge is joined with said upper door section.

8. The door of claim 1, wherein a window panel is fixedly attached to said upper door panel for increasing structural rigidity.

9. A door for a vehicle to selectively close an opening that permits access into the vehicle, comprising:

an upper door frame for pivotally mounting to a vehicle for rotation about a first generally horizontal pivot axis and having a top member, a bottom member, and a pair of side members connecting said top and bottom members;

a lower door frame pivotally connected to said upper door frame for rotation about a second generally horizontal pivot axis and having a top member, a bottom member, and a pair of side members connecting said top and bottom members;

at least one central hinge located between said upper and lower frames for providing pivotal relative movement;

a first link having a first end for pivotal connection to the vehicle and a second end pivotally connected to said door, said first link having a housing and a member that is movable linearly relative to said housing; and a second link having a first end pivotally connected to said first link and a second end pivotally connected to said door.

10. The door of claim 9, wherein said lower frame rotates inwardly to a position under said upper frame.

11. the door of claim 9, wherein at least one of said upper and lower frames is made from magnesium.

12. The door of claim 9, wherein said upper frame further includes generally U-shaped channel portions having reinforcing webs located in said channel portions.

13. The door of claim 9, wherein said lower frame further includes at least one angled support extending from said top member toward a lower corner defined by an intersection of said side member and said bottom member.

14. The door of claim 9, wherein said second link is pivotally attached to said housing.

15. The door of claim 14, wherein said first link is attached to said upper frame and said second link is attached to said lower frame.

16. The door of claim 9, wherein at least a portion of an upper hinge is joined with said upper frame.

17. The door of claim 9, wherein a window panel is fixedly attached to said upper frame for increasing structural rigidity.

18. The door of claim 10, wherein said bottom member of said upper door frame includes an arcuate surface positioned in overlapping relationship with a complementary shaped surface on said top member of said lower door frame to provide a shield feature between said upper and lower door frames during relative movement.

19. The door of claim 18, wherein said shield feature further comprises said arcuately shaped surface of said upper door frame being concentric with said complementary shaped surface on said lower door frame.

* * * * *

UNITED STATES PATENT AND TRADEMARK OFFICE
CERTIFICATE OF CORRECTION

PATENT NO : 6,068,327
DATED : May 30, 2000
INVENTOR(S) : Michael Junginger

It is certified that error appears in the above-identified patent and that said Letters Patent are hereby corrected as shown below:

Col. 6, line 22
 replace "the"
 with --The--.

Col. 6, line 41
 replace "10"
 with --9--.

Signed and Sealed this

Third Day of April, 2001

*Attest:*

*Attesting Officer*

NICHOLAS P. GODICI

*Acting Director of the United States Patent and Trademark Office*